(12) United States Patent
Lee et al.

(10) Patent No.: US 8,928,523 B2
(45) Date of Patent: Jan. 6, 2015

(54) METHOD AND RADAR APPARATUS FOR DETECTING TARGET OBJECT

(75) Inventors: Jae Eun Lee, Hwaseong-si (KR); Seong Hee Jeong, Seoul (KR); Joo Yeol Yang, Namyangju-si (KR); Seung Un Choi, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 441 days.

(21) Appl. No.: 13/348,373

(22) Filed: Jan. 11, 2012

(65) Prior Publication Data

US 2012/0176266 A1    Jul. 12, 2012

(30) Foreign Application Priority Data

Jan. 12, 2011   (KR) .................. 10-2011-0003025

(51) Int. Cl.
*G01S 13/93*    (2006.01)
*G01S 7/35*    (2006.01)
*G01S 7/02*    (2006.01)
*G01S 13/34*    (2006.01)

(52) U.S. Cl.
CPC . *G01S 7/35* (2013.01); *G01S 7/023* (2013.01); *G01S 13/931* (2013.01); *G01S 13/345* (2013.01)
USPC ............................................ 342/70; 342/159

(58) Field of Classification Search
CPC ......... G01S 13/931; G01S 7/414; G01S 7/35; G01S 13/345; G01S 7/023
USPC .............................................. 342/70–72, 159
See application file for complete search history.

(56) References Cited

U.S. PATENT DOCUMENTS

| | | | |
|---|---|---|---|
| 2004/0222919 A1* | 11/2004 | Isaji | 342/70 |
| 2006/0012511 A1* | 1/2006 | Dooi et al. | 342/70 |
| 2006/0103571 A1* | 5/2006 | Isaji | 342/70 |
| 2009/0066561 A1 | 3/2009 | Yoshimura | |

FOREIGN PATENT DOCUMENTS

| | | |
|---|---|---|
| CN | 1099139 A | 2/1995 |
| CN | 101356451 A | 1/2009 |

* cited by examiner

*Primary Examiner* — John B Sotomayor
(74) *Attorney, Agent, or Firm* — McDermott Will & Emery LLP

(57) ABSTRACT

Disclosed is a method and a radar apparatus for transmitting a transmission signal at a controlled timing in order to avoid signal interference, thereby exactly detecting a target object without misrecognition.

11 Claims, 8 Drawing Sheets

— FREQUENCY DIFFERENCE BETWEEN TRANSMISSION SIGNAL AND RECEIVED SIGNAL
-------- FREQUENCY DIFFERENCE BETWEEN TRANSMISSION SIGNAL AND INTERFERENCE SIGNAL

— FREQUENCY EXTRACTED FROM REAL OBJECT
-------- FREQUENCY EXTRACTED FROM INTERFERENCE SIGNAL

METHOD AND RADAR APPARATUS FOR DETECTING TARGET OBJECT

CROSS-REFERENCE TO RELATED APPLICATION

This application claims priority from and the benefit under 35 U.S.C. §119(a) of Korean Patent Application No. 10-2011-0003025, filed on Jan. 12, 2011, which is hereby incorporated by reference for all purposes as if fully set forth herein.

BACKGROUND OF THE INVENTION

1. Field of the Invention

The present invention relates to a radar technology, and more particularly to a method and a radar apparatus for transmitting a transmission signal at a controlled timing in order to avoid signal interference, thereby exactly detecting a target object without misrecognition.

2. Description of the Prior Art

Recently, many types of vehicle control systems for controlling a vehicle by using a radar apparatus for detecting a surrounding object have been developed. For exact control of a vehicle by such a vehicle control system, it is indispensable to achieve an exact detection of an object by a radar apparatus.

However, if a transmission signal transmitted for detection of an object by a radar apparatus makes an interference with a transmission signal transmitted by another radar apparatus or another communication apparatus located in the vicinity, the radar apparatus may fail to detect a real object existing in the vicinity or misrecognize a virtual object, which is not a real object, as a real object.

SUMMARY OF THE INVENTION

Accordingly, the present invention has been made to solve the above-mentioned problems occurring in the prior art, and an aspect of the present invention is to provide a method and a radar apparatus for reducing an interference between a transmission signal transmitted for detection of an object by the radar apparatus and a transmission signal transmitted by another radar apparatus or another communication apparatus located in the vicinity.

Another aspect of the present invention is to provide a method and a radar apparatus for reducing a probability that the radar apparatus may misrecognize a virtual object as a real object, so as to enable the radar apparatus to achieve an exact detection of a real object without misrecognition.

In order to accomplish this object, there is provided a radar apparatus mounted to a vehicle and detecting a target object around the vehicle, the radar apparatus including: a signal transmitter for controlling transmission start point intervals between transmission start points of transmission signals and transmitting a transmission signal at every transmission start point determined by the controlled transmission start point intervals; a signal receiver for receiving a reflection signal generated by reflection of a transmitted signal by surroundings; an interference signal remover for removing an interference signal from the received reflection signal by causing the reflection signal to pass through a filter; and a target object detector for detecting a target object through signal processing of the received reflection signal from which the interference signal has been removed.

In accordance with another aspect of the present invention, there is provided a method for detecting a target object around a vehicle by a radar apparatus mounted to the vehicle, the method including: controlling transmission start point intervals between transmission start points of transmission signals and transmitting a transmission signal at every transmission start point determined according to the controlled transmission start point intervals; receiving a reflection signal generated by reflection of a transmitted signal by surroundings; removing an interference signal from the received reflection signal by causing the reflection signal to pass through a filter; and detecting a target object through signal processing of the received reflection signal from which the interference signal has been removed.

According to the present invention as described above, it is possible to reduce the interference between a transmission signal transmitted for detection of an object by the radar apparatus and a transmission signal transmitted by another radar apparatus or another communication apparatus located in the vicinity.

Further, according to the present invention, it is possible to reduce a probability that the radar apparatus may misrecognize a virtual object as a real object, so as to enable the radar apparatus to achieve an exact detection of a real object without misrecognition.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
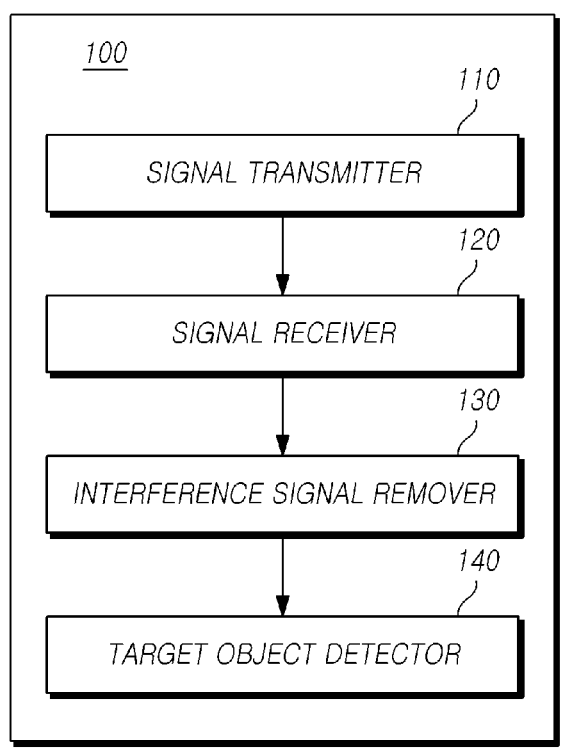
FIG. 1 is a block diagram of a radar apparatus according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram of a radar apparatus 100 according to an embodiment of the present invention.

As shown in FIG. 1, the radar apparatus 100 according to an embodiment of the present invention includes a signal transmitter 110 for controlling transmission start point intervals between transmission start points of transmission signals and transmitting a transmission signal at every transmission start point determined by the controlled transmission start point intervals, a signal receiver 120 for receiving a reflection signal generated by reflection of a transmitted signal, which has been transmitted from the signal transmitter 110, by surroundings, an interference signal remover 130 for removing an interference signal from a received reflection signal, which has been received by the signal receiver 120, by causing the received reflection signal to pass through a filter, and a target object detector 140 for detecting a target object through processing of the received reflection signal from which the interference signal has been removed.

The interference signal mentioned above is a signal corresponding to an interference component other than the reflection signal component reflected by a target object (real object) to be detected by the radar apparatus 100, and is a signal corresponding to a disturbance component, which disturbs an exact detection of the target object. The interference signal may be, for example, a transmission signal transmitted from another communication apparatus or another radar apparatus located in the vicinity, or may be a transmission signal transmitted from a radar apparatus mounted to another vehicle located in the vicinity of the current vehicle to which the radar apparatus 100 is mounted.

The signal transmitter 110 controls transmission start point intervals between transmission start points of a transmission signal while making at least one of all transmission start point intervals become different from the other transmission start point intervals.

Further, the signal transmitter 110 may transmit one transmission signal at every signal processing time set for the signal processing.

As used herein, the signal processing time refers to a time for processing a received signal in order to detect a target object, wherein the reflection signal corresponds to a signal remaining after removing an interference signal from a reflection signal, which is generated by reflection of a transmission signal by surroundings and is received at a delayed time (time including delay time due to a distance from an object) from a transmission start point of the transmission signal.

The signal processing time may have either a same fixed value for all transmission signals or a variable value according to each transmission signal.

Therefore, the signal transmitter 110 may transmit one transmission signal at every signal processing time set for the signal processing. At this time, in controlling the transmission start point intervals between transmission start points of the transmission signal, when the signal processing time is controlled to have a same fixed value for all transmission signals, the transmission start point interval between transmission start points of the transmission signal may be variably controlled by controlling an interval from a start point of the signal processing time to a transmission start point of a corresponding transmission signal. Further, when the signal processing time is controlled to have a variable value according to each transmission signal, the transmission start point interval between transmission start points of the transmission signal may be variably controlled by variably controlling the signal processing time of each transmission signal.

The scheme of transmitting a transmission signal as described above will be described hereinafter with reference to FIG. 2.

Figure 2:
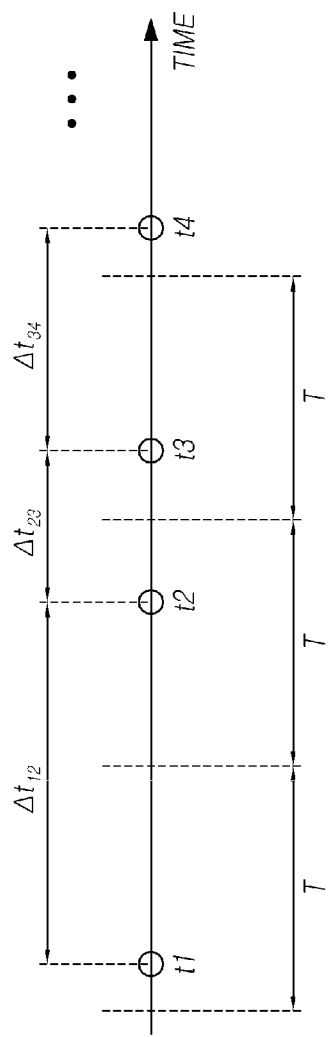
FIG. 2 is a graph showing an example of a scheme for transmitting a transmission signal by a radar apparatus according to an embodiment of the present invention.

Referring to FIG. 2, based on an assumption that the signal processing time is T, the signal transmitter 110 may transmit one transmission signal at every signal processing time T while variably controlling the transmission start point within the signal processing time T.

Referring to FIG. 2, by variably controlling the transmission start point within the signal processing time T, the first transmission signal is transmitted at time point t1 (the first transmission start point) within the first signal processing time, the second transmission signal is transmitted at time point t2 (the second transmission start point) within the second signal processing time, the third transmission signal is transmitted at time point t3 (the third transmission start point) within the third signal processing time, and the fourth transmission signal is transmitted at time point t4 (the fourth transmission start point) within the fourth signal processing time.

Here, the transmission start point intervals, which correspond to intervals between transmission start points, are $t_{12}$, $t_{23}$, $t_{34}$, ..., which are not the same. That is, at least one of the transmission start point intervals ($^{\Delta}t_{12}$, $^{\Delta}t_{23}$, $^{\Delta}t_{34}$, ...) may have a value different from those of the other intervals.

By transmitting the transmission signal in the way described above while variably controlling the transmission start points so that at least one of the transmission start point intervals has a value different from those of the other intervals, it is possible to reduce the influence of signal interference by a signal (i.e. interference signal) transmitted from another radar apparatus or another communication apparatus.

Meanwhile, the signal transmitter 110 can achieve a transmission frequency band control through setting of a transmission frequency band of each transmission signal within an available frequency band, as well as achieving a transmission timing control through controlling of transmission start point intervals by controlling the transmission start point of each transmission signal.

The signal transmitter 110 can change the transmission frequency band within an available frequency band so as to make the transmission frequency band for at least one transmission signal become different from the frequency band of the interference signal.

When the signal transmitter 110 transmits the transmission signal at every transmission frequency cycle, the signal transmitter 110 may optionally determine the transmission frequency band according to each transmission frequency cycle within the available frequency band or change the transmission frequency band of each transmission frequency cycle within the available frequency band either according to predetermined transmission frequency band sequence information or randomly.

In order to minimize the influence of the signal interference, the signal transmitter 110 as described above can control at least one of all transmission start point intervals through a transmission timing control, so as to reduce a probability that the timing of a transmission signal (or a reflection signal) may coincide with the timing of another surrounding signal, which can reduce the signal interference. Moreover, by setting at least one transmission frequency band to be different from the other transmission frequency band through a transmission frequency band control, the signal transmitter 110 can reduce a probability that the transmission frequency band of a transmission signal (or a reflection signal) may coincide with the transmission frequency cycle of another surrounding signal, which can further reduce the signal interference.

The reflection signal generated by a reflection of the transmission signal transmitted in the way described above is received by the signal receiver 120. At this time, after the transmission of the transmission signal at the transmission start point, the signal receiver 120 performs the receiving of the reflection signal up to the time point at which a signal reflected by an object located at a predetermined farthest detection distance preset according to a specification in the radar apparatus 100 is received.

The interference signal remover 130 described above removes an interference signal from the reflection signal received by the signal receiver 120 by causing the reflection signal to pass through a filter, and inputs the reflection signal, from which the interference signal has been removed, to the target object detector 140.

The target object detector 140 detects the target object through a signal processing of the reflection signal. In the signal processing, the target object detector 140 performs a Fourier Transform so as to extract a frequency variance fr according to the distance and a Doppler frequency fd according to the speed, and calculates the speed and distance of the target object based on the frequency variance fr according to the distance and the Doppler frequency fd according to the speed.

Even after the interference signal has been removed by a filter in the interference signal remover 130, an interference signal component (residual interference signal) may remain in the reflection signal input to the target object detector 140. The target object detector 140 can perform a tracking processing, so as to prevent the residual interference signal from being used as a signal for detection of the target object.

The target object detector 140 as described above may perform a tracking of the received signal and counts the number of times by which an estimation object estimated as a target object is detected. When the counted number of times is larger than or equal to a predetermined threshold, the target object detector 140 determines the estimation object as the real target object.

In contrast, when the counted number of times is smaller than the predetermined threshold, the target object detector 140 determines the estimation object as a ghost object due to the interference signal and prevents the residual interference signal from being used as a signal for detection of the target object, thereby making a control to prevent the ghost object from being detected as the target object.

As used herein, the "ghost object" refers to a virtual object, which is not a really existing object but is misrecognized like a real object due to an error or inaccuracy of the detection. Further, the ghost object may refer to a virtual object detected due to an interference signal.

If such a ghost object is detected by a radar apparatus 100, an inappropriate control may be performed in a vehicle control system using a result of the detection by the radar apparatus 100, and more seriously, a car accident or deadly consequences may occur.

Meanwhile, the radar apparatus 100 according to an embodiment of the present invention may be a radar apparatus employing one frequency modulation scheme among an FMCW (Frequency Modulated Continuous Wave) scheme, a Pulse Doppler scheme, an FSK (Frequency Shift Keying) scheme, and an FMSK (Frequency Modulated Shift Keying) scheme.

Hereinafter, a scheme of transmitting a transmission signal for detection of a target object by the radar apparatus 100 according to an embodiment of the present invention, and relative characteristics between the transmission signal, the interference signal, and the reflection signal will be described with reference to FIGS. 3 to 7.

Figure 3:
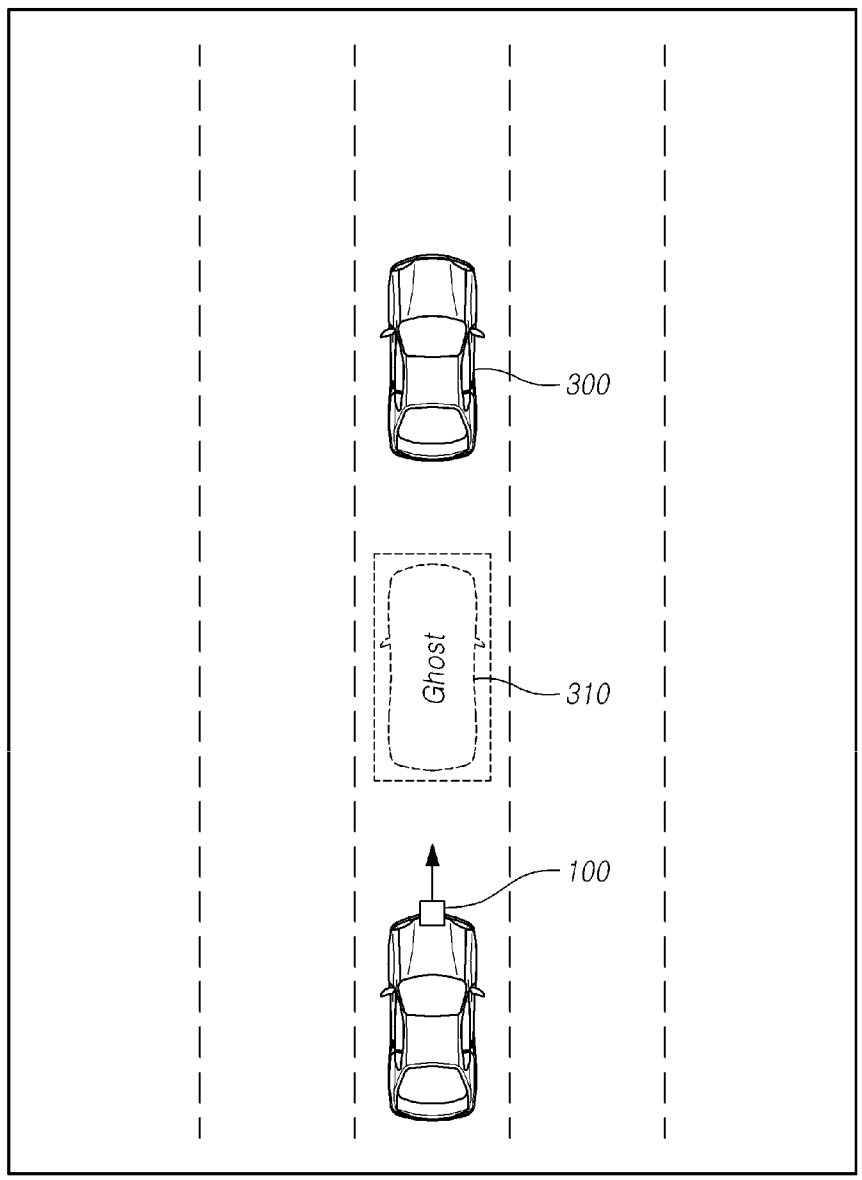
FIG. 3 is a view showing an example of detecting a target object by a radar apparatus according to an embodiment of the present invention.

FIG. 3 is a view showing an example of detecting a target object 300 by the radar apparatus 100 according to an embodiment of the present invention.

Referring to FIG. 3, the radar apparatus 100 according to an embodiment of the present invention transmits a transmission signal, receives a reflection signal coming back after a reflection, and detects an object by using the reflection signal.

If the reflection signal includes only a signal component reflected by the target object 300, which is a real object, it is possible to exactly detect the target object 300. However, if a transmission signal transmitted from another radar apparatus or another communication apparatus located in the vicinity functions as an interference signal or if an interference signal due to another factor exists, and if such an interference signal is received as a reflection signal together with the real reflection signal reflected by the target object 300, a ghost object 310, which is not a real object, may be detected due to such an interference signal.

The radar apparatus 100 according to an embodiment of the present invention can exactly detect the target object 300, which is a real object. Moreover, the radar apparatus 100 can control the transmission timing and/or the transmission frequency band of the transmission signal, so as to minimize the signal interference, thereby preventing the detection of a ghost object instead of a real object.

That is, the radar apparatus 100 according to an embodiment of the present invention can prevent the signal interference by causing the time points of signal transmission and reception to become different from each other, in the case of using the same frequency band. In general, since the duration for transmitting a transmission signal is shorter than the duration (signal processing time) for processing a reflection signal, the radar apparatus 100 can change the transmission start points within the signal processing time, so as to reduce the influence by an interference signal from another radar apparatus (or another communication apparatus) located in the vicinity.

Figure 4:
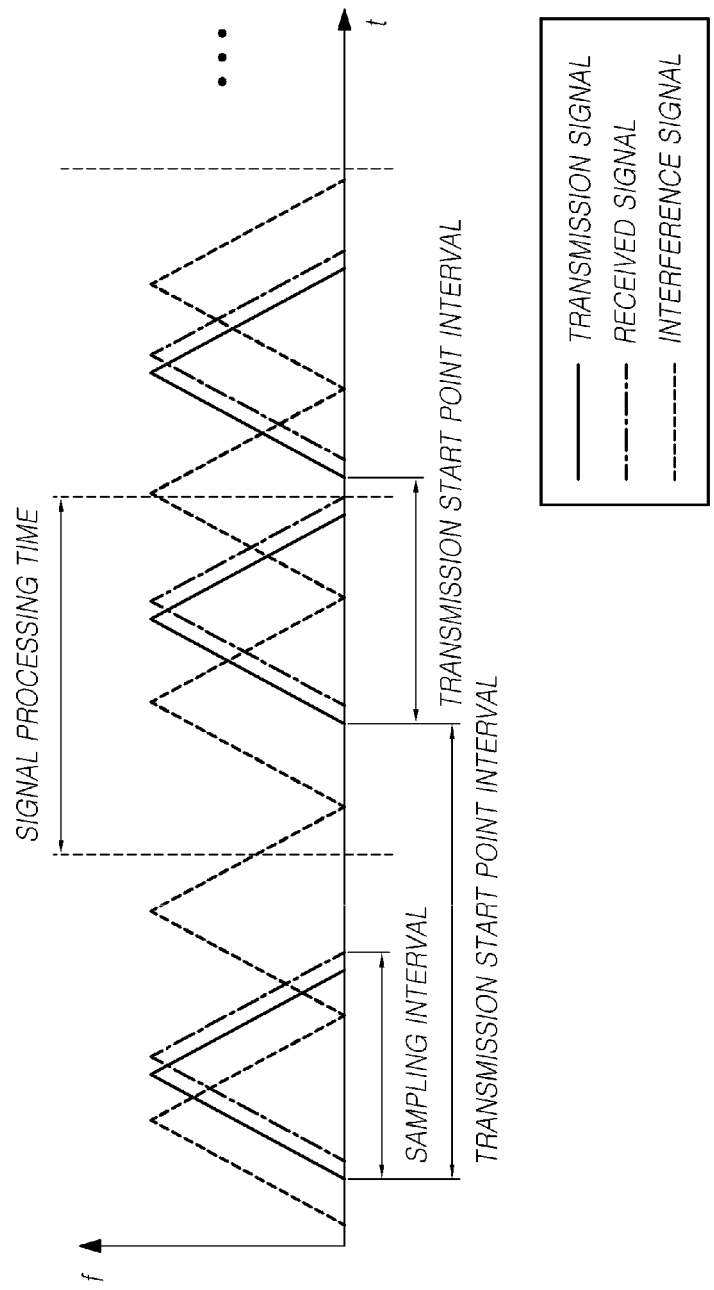
FIG. 4 is a graph showing a transmission signal transmitted for detection of a target object by a radar apparatus according to an embodiment of the present invention, and a received signal and an interference signal included in a reflection signal generated through reflection of the transmission signal by surroundings.

Referring to FIG. 4 as an example, based on an assumption that the space between vertical dotted lines corresponds to a signal processing time, when the transmission signal is transmitted while changing the transmission start point of the transmission signal (solid line) between the vertical dotted lines, the reflection signal (one-dot-chain line) reflected by an actual object is also received within the same duration due to the delay by the real object, which has been reflected in the reflection signal. Further, a transmission signal transmitted from another radar apparatus (or another communication apparatus) located in the vicinity may be received together as an interference signal (dotted line).

It is noted from FIG. 4 that the transmission start points are changed within the signal processing time so as to control the transmission start point intervals to become different from each other.

Referring to FIG. 4, in processing the received signal, the sampling interval for sampling of the received signal corresponds to the duration from the transmission start point at which the transmission signal is transmitted to the time point at which the received signal reflected by an object located at a predetermined maximum detection distance can be detected.

Figure 5:
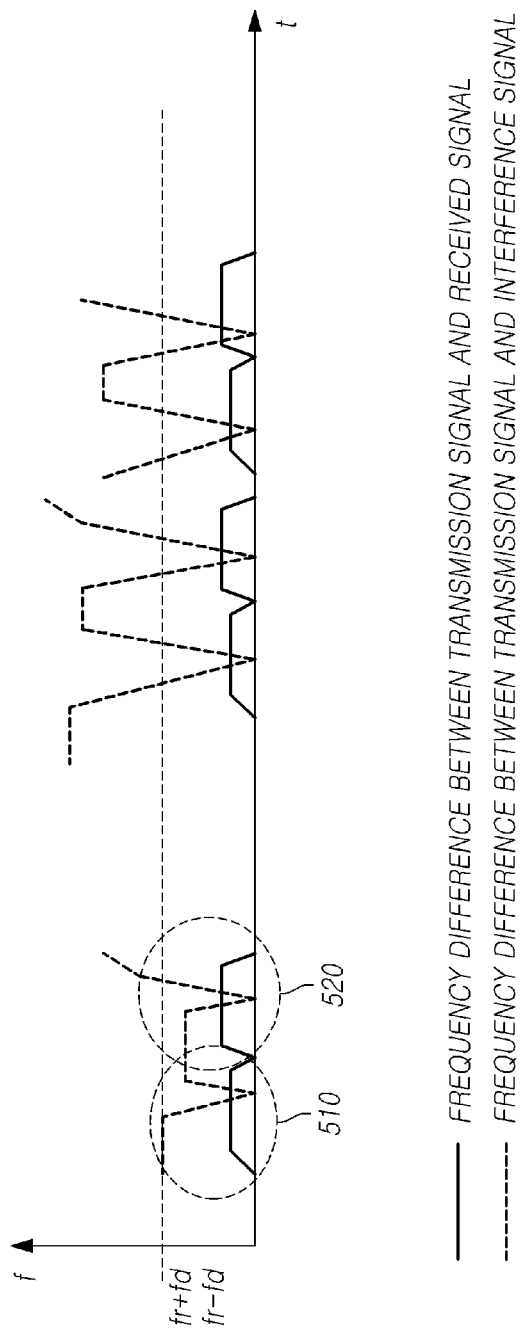
FIG. 5 is a graph showing a frequency difference between a transmission signal and a received signal and a frequency difference between a transmission signal and an interference signal.
Figure 6:
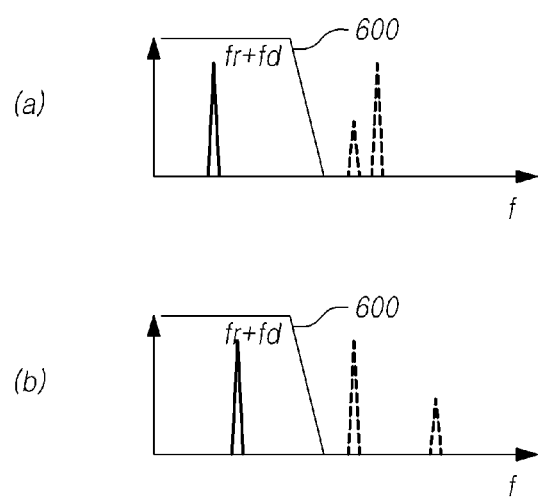
FIGS. 6A and 6B are graphs showing an example in which frequencies are extracted from an up-chirp interval and a down-chirp interval, respectively.

By using the transmission signal, the received signal, and the interference signal shown in FIG. 4, it is possible to obtain the frequency difference (dotted line) between the transmission signal and the interference signal and the frequency difference (solid line) between the transmission signal and the received signal as shown in FIG. 5.

Referring to FIG. 5, if the timing accidentally does not match, the frequency difference (dotted line) between the transmission signal and the interference signal becomes larger than the frequency difference (solid line) between the transmission signal and the received signal, and this large frequency is filtered by a Low Pass Filter (LPF).

FIGS. 6A and 6B are graphs showing an example in which signals of the up-chirp interval 510 and the down-chirp interval 520 in FIG. 5 have been extracted through a Fast Fourier Transform (FFT), respectively.

FIG. 6A shows a frequency extracted through an FFT of the up-chirp interval 510, and FIG. 6B shows a frequency extracted through an FFT of the down-chirp interval 520. A frequency obtained by filtering the extracted frequency by a filter 600 includes a frequency variance fr according to the distance and a Doppler frequency fd according to the speed. That is, the frequency $f_{up}$ in FIG. 6A is equal to (fr−fd), and the frequency $f_{down}$ down in FIG. 6B is equal to (fr+fd). Therefore, by combining equations, $f_{up}$=fr−fd and $f_{down}$=fr+fd, it is possible to obtain fr and fd.

By using the obtained fr and fd and equations (1) and (2) defined below, it is possible to obtain the speed of the target object 300 and the distance to the target object 300.

$$f_r = \frac{2R}{C} \times \frac{B}{\tau} \quad (1)$$

$$f_d = \frac{2V}{C} \times f_c \quad (2)$$

In equations (1) and (2), R indicates the distance, V indicates the speed, C indicates the speed of light, B indicates a bandwidth (transmission frequency band), τ indicates a chirp time, and fc indicates a central frequency.

As described above, if the radar apparatus 100 according to an embodiment of the present invention randomly changes transmission start points of a transmission signal, it is possible to remarkably reduce the probability that the timing of the transmission signal and an interference signal may coincide, so as to prevent occurrence of signal interference. Even if the timing matches and an interference signal is received (that is, the reflection signal includes an interference signal), a tracking by the target object detector 140 can reduce the probability that a ghost object 310 instead of a real object may be detected.

Further, not only can the radar apparatus 100 according to an embodiment of the present invention remarkably reduce the probability of coincidence between the timings of the transmission signal and an interference signal and thus prevent occurrence of signal interference by randomly changing transmission start points of a transmission signal, the radar apparatus 100 can change the transmission frequency band of each transmission signal, which can further reduce the probability of coincidence between the timings of the transmission signal and an interference signal and thus increase the prevention of the occurrence of signal interference.

Figure 7:
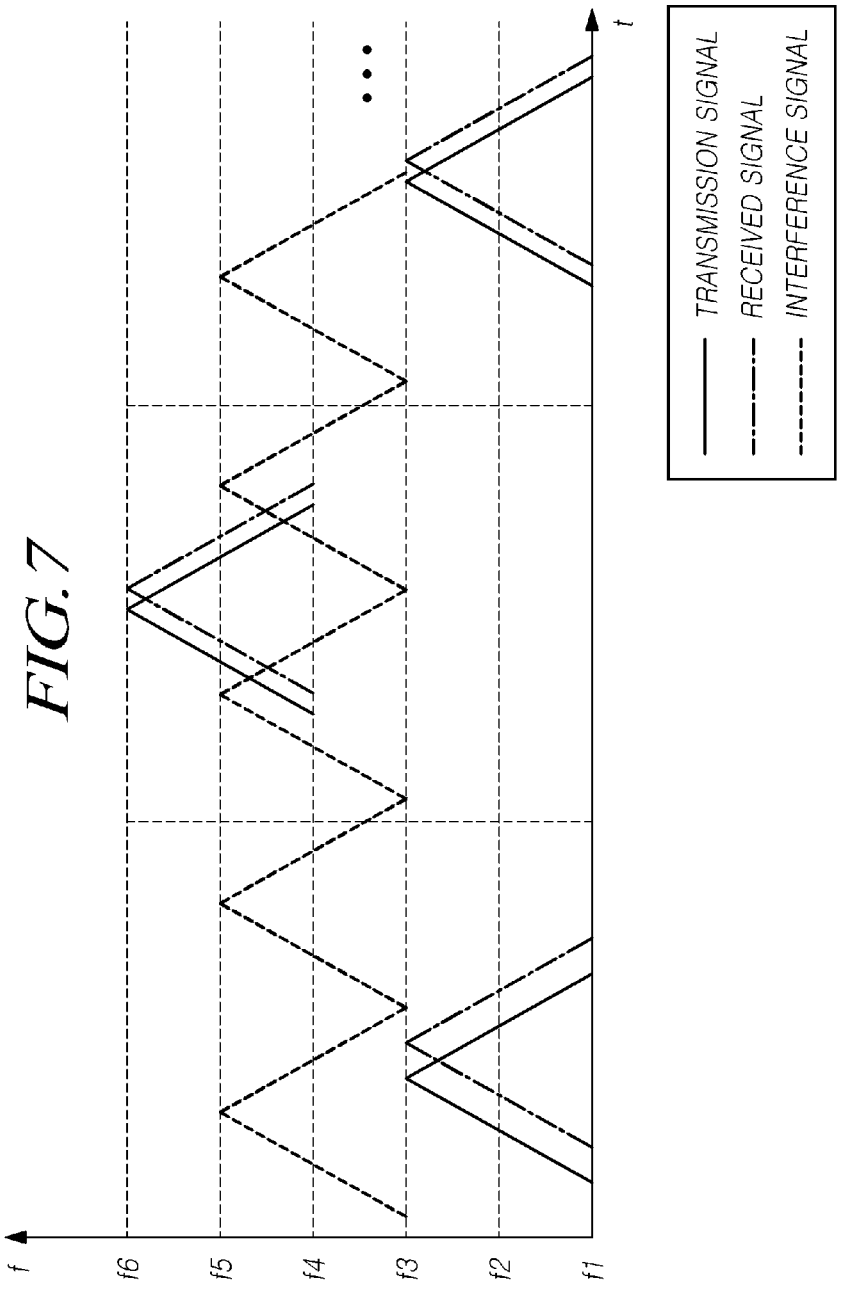
FIG. 7 is a graph showing an example of a method of transmitting a transmission signal by controlling transmission start point intervals and transmission frequency bands by the radar apparatus according to an embodiment of the present invention.

FIG. 7 is a graph showing an example of a method of transmitting a transmission signal by controlling transmission start point intervals and transmission frequency bands by the radar apparatus 100 according to an embodiment of the present invention.

It is noted from FIG. 7 that, through the controlling of the transmission start point intervals, the transmission start points are variably changed within a signal processing time, and the transmission frequency bands of the transmission signals are changed to f1~f3, f4~f6, and f1~f3, so that the probability of coincidence between frequency bands of the interference signal and the transmission signal decreases.

Figure 8:
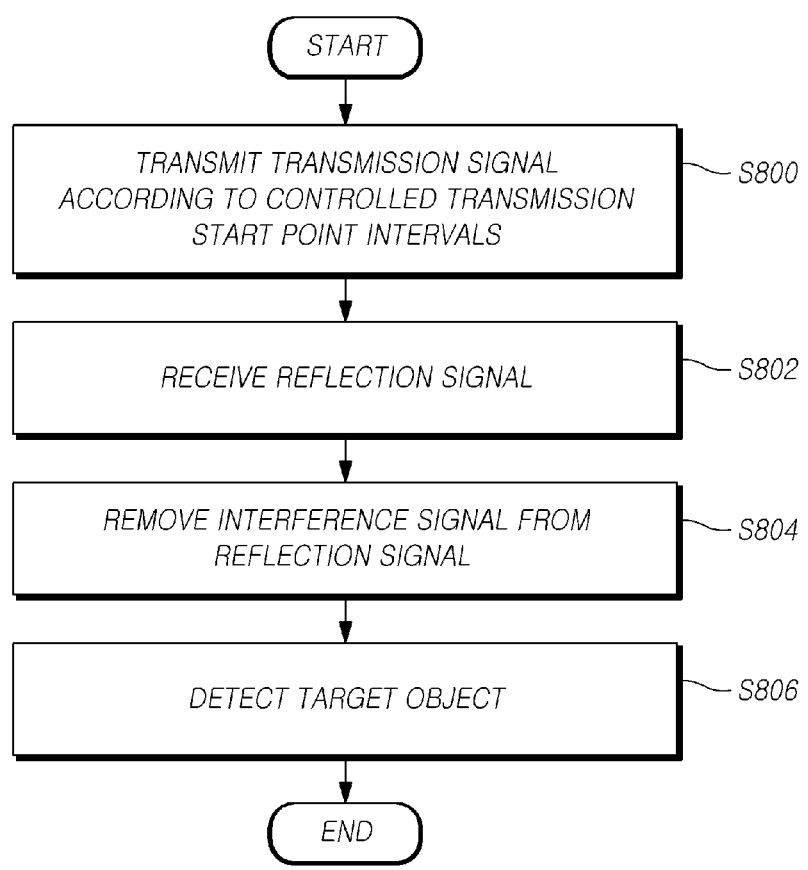
FIG. 8 is a flowchart of a method for detecting a target object by a radar apparatus according to an embodiment of the present invention.

FIG. 8 is a flowchart of a method for detecting a target object by a radar apparatus 100 according to an embodiment of the present invention.

Referring to FIG. 8, the method for detecting a target object by the radar apparatus 100 according to an embodiment of the present invention includes: controlling transmission start point intervals between transmission start points of transmission signals and transmitting a transmission signal at every transmission start point determined according to the controlled transmission start point intervals (step S800); receiving a reflection signal generated by reflection of the transmission signal by the surroundings (step S802); removing an interference signal from the received reflection signal by causing the reflection signal to pass through a filter (step S804); and detecting a target object based on the received reflection signal from which the interference signal has been removed (step S806).

In step S800 as described above, the transmission start point intervals may be controlled such that at least one of the transmission start point intervals becomes different from the other transmission start point intervals.

Further, in step S800 as described above, the transmission can be performed while variably setting the transmission frequency band of each transmission signal within an available frequency band.

As described above, the present invention can reduce the interference between a transmission signal transmitted for detection of an object by a radar apparatus and a transmission signal transmitted by another radar apparatus or another communication apparatus located in the vicinity.

Further, the present invention can reduce a probability that the radar apparatus may misrecognize a virtual object as a real object, so as to enable the radar apparatus to achieve an exact detection of a real object without misrecognition.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A radar apparatus mounted to a vehicle and detecting a target object around the vehicle, the radar apparatus comprising:
    a signal transmitter/controller configured to variably control transmission start point intervals between transmission start points of transmission signals and transmit a transmission signal at every transmission start point determined by the controlled transmission start point intervals;
    a signal receiver configured to receive a reflection signal generated by reflection of a transmitted signal by surroundings;
    an interference signal remover configured to remove an interference signal from the received reflection signal by causing the reflection signal to pass through a filter; and
    a target object detector configured to detect a target object through signal processing of the received reflection signal from which the interference signal has been removed,
    wherein the signal transmitter/controller as configured to control the transmission start point intervals while making at least one of the transmission start point intervals become different from the other transmission start point intervals.

2. The radar apparatus as claimed in claim 1, wherein the signal transmitter/controller is configured to transmit one transmission signal at every signal processing time set for the signal processing.

3. The radar apparatus as claimed in claim 1, wherein the signal transmitter/controller as configured variably control the transmission start point intervals by controlling an interval from a start point of a signal processing time to a transmission start point of a corresponding transmission signal when the signal processing time is controlled to have a same fixed value for all transmission signals, and
    the signal transmitter/controller as configured to variably control the transmission start point intervals by variably controlling the signal processing time of each transmission signal when the signal processing time is controlled to have a variable value according to each transmission signal.

4. The radar apparatus as claimed in claim 1, wherein, in the signal processing, the target object detector is configured to perform a Fourier Transform so as to extract a frequency variance according to a distance and a Doppler frequency according to a speed, and calculates a speed and a distance of the target object based on the frequency variance according to the distance and the Doppler frequency according to the speed.

5. The radar apparatus as claimed in claim 1, wherein the target object detector is configured to perform a tracking of the received signal, so as to count the number of times by which an estimation object estimated as a target object is detected, and determine the estimation object as the real target object when the counted number of times is larger than or equal to a predetermined threshold.

6. The radar apparatus as claimed in claim 1, wherein the target object detector is configured to perform a tracking of the received signal so as to count the number of times by which an estimation object estimated as a target object is detected, and when the counted number of times is smaller than a predetermined threshold, the target object detector as configured determines the estimation object as a ghost object due to the interference signal and makes a control to prevent the ghost object from being detected as the target object.

7. The radar apparatus as claimed in claim 1, wherein the signal transmitter/controller is configured to set a transmission frequency band of each transmission signal within an available frequency band while making at least one of all transmission frequency bands become different from the other transmission frequency bands.

8. The radar apparatus as claimed in claim 1, wherein, after transmission of one transmission signal at a transmission start point, the signal receiver is configured to receive a corresponding reflection signal up to a time point at which a signal reflected by an object located at a predetermined maximum detection distance is received.

9. The radar apparatus as claimed in claim 1, wherein the interference signal is a transmission signal transmitted from a radar apparatus mounted to another vehicle located around the vehicle.

10. A method for detecting a target object around a vehicle by a radar apparatus mounted to the vehicle, the method comprising:
    variably controlling transmission start point intervals between transmission start points of transmission signals such that at least one of the transmission start point intervals becomes different from the other transmission start point intervals, and transmitting a transmission signal at every transmission start point determined according to the controlled transmission start point intervals;
    receiving a reflection signal generated by reflection of a transmitted signal by surroundings;

removing an interference signal from the received reflection signal by causing the reflection signal to pass through a filter; and detecting a target object through signal processing of the received reflection signal from which the interference signal has been removed.

11. The method as claimed in claim 10, wherein, in transmitting of the transmission signal, the transmission is performed while variably setting a transmission frequency band of each transmission signal within an available frequency band.

* * * * *